(12) United States Patent
Kucherov et al.

(10) Patent No.: US 11,106,384 B2
(45) Date of Patent: Aug. 31, 2021

(54) STORAGE MANAGEMENT SYSTEM AND METHOD

(71) Applicant: EMC IP Holding Company, LLC, Hopkinton, MA (US)

(72) Inventors: Anton Kucherov, Dudley, MA (US); Vamsi Vankamamidi, Hopkinton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 158 days.

(21) Appl. No.: 16/402,761

(22) Filed: May 3, 2019

(65) Prior Publication Data

US 2020/0348848 A1    Nov. 5, 2020

(51) Int. Cl.
   *G06F 3/06* (2006.01)
(52) U.S. Cl.
   CPC ............ *G06F 3/065* (2013.01); *G06F 3/0604* (2013.01); *G06F 3/0659* (2013.01); *G06F 3/0685* (2013.01)

(58) Field of Classification Search
   None
   See application file for complete search history.

(56) References Cited

U.S. PATENT DOCUMENTS

| 6,941,396 | B1* | 9/2005 | Thorpe | G06F 3/0613 |
| | | | | 707/999.202 |
| 9,478,274 | B1* | 10/2016 | Michaud | G06F 12/0811 |
| 2019/0377676 | A1* | 12/2019 | Szczepanik | G06F 12/0868 |
| 2020/0274925 | A1* | 8/2020 | Suarez | G06F 3/0647 |

\* cited by examiner

*Primary Examiner* — Denise Tran
(74) *Attorney, Agent, or Firm* — Brian J. Colandreo; Mark H. Whittenberger; Holland & Knight LLP (57) ABSTRACT

A method, computer program product, and computing system for receiving locally-generated original data and remotely-generated replication data on the computing device; initially storing the locally-generated original data in a non-volatile memory system; initially storing the remotely-generated replication data in a volatile memory system; subsequently storing the locally-generated original data in a faster-tier storage system; and subsequently storing the remotely-generated replication data in a slower-tier storage system.

21 Claims, 3 Drawing Sheets

STORAGE MANAGEMENT SYSTEM AND METHOD

TECHNICAL FIELD

This disclosure relates to storage management processes and, more particularly, to storage management processes for use in multitier storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to inherent limitations in some of the memory technology utilized in such storage systems, complex methodologies may need to be utilized in order to navigate around such inherent shortcomings.

SUMMARY OF DISCLOSURE

In one implementation, a computer-implemented method is executed on a computing device and includes: receiving locally-generated original data and remotely-generated replication data on the computing device; initially storing the locally-generated original data in a non-volatile memory system; initially storing the remotely-generated replication data in a volatile memory system; subsequently storing the locally-generated original data in a faster-tier storage system; and subsequently storing the remotely-generated replication data in a slower-tier storage system.

One or more of the following features may be included. The non-volatile memory system may be a cache memory system and the volatile memory system may be a memory buffer. Subsequently storing the locally-generated original data in a faster-tier storage system may include one or more of: compressing the locally-generated original data; and deduplicating the locally-generated original data. Subsequently storing the remotely-generated replication data in a slower-tier storage system may include one or more of: compressing the remotely-generated replication data; and deduplicating the remotely-generated replication data. Subsequently storing the locally-generated original data in a faster-tier storage system may include migrating the locally-generated original data from the non-volatile memory system to a physical memory device associated with the faster-tier storage system. Subsequently storing the remotely-generated replication data in a slower-tier storage system may include migrating the remotely-generated replication data from the volatile memory system to a physical memory device associated with the slower-tier storage system. The slower-tier storage system may be an electromechanical storage system; and the faster-tier storage system may be a solid state storage system.

In another implementation, a computer program product resides on a computer readable medium and has a plurality of instructions stored on it. When executed by a processor, the instructions cause the processor to perform operations including receiving locally-generated original data and remotely-generated replication data on the computing device; initially storing the locally-generated original data in a non-volatile memory system; initially storing the remotely-generated replication data in a volatile memory system; subsequently storing the locally-generated original data in a faster-tier storage system; and subsequently storing the remotely-generated replication data in a slower-tier storage system.

One or more of the following features may be included. The non-volatile memory system may be a cache memory system and the volatile memory system may be a memory buffer. Subsequently storing the locally-generated original data in a faster-tier storage system may include one or more of: compressing the locally-generated original data; and deduplicating the locally-generated original data. Subsequently storing the remotely-generated replication data in a slower-tier storage system may include one or more of: compressing the remotely-generated replication data; and deduplicating the remotely-generated replication data. Subsequently storing the locally-generated original data in a faster-tier storage system may include migrating the locally-generated original data from the non-volatile memory system to a physical memory device associated with the faster-tier storage system. Subsequently storing the remotely-generated replication data in a slower-tier storage system may include migrating the remotely-generated replication data from the volatile memory system to a physical memory device associated with the slower-tier storage system. The slower-tier storage system may be an electromechanical storage system; and the faster-tier storage system may be a solid state storage system.

In another implementation, a computing system includes a processor and memory is configured to perform operations including receiving locally-generated original data and remotely-generated replication data on the computing device; initially storing the locally-generated original data in a non-volatile memory system; initially storing the remotely-generated replication data in a volatile memory system; subsequently storing the locally-generated original data in a faster-tier storage system; and subsequently storing the remotely-generated replication data in a slower-tier storage system.

One or more of the following features may be included. The non-volatile memory system may be a cache memory system and the volatile memory system may be a memory buffer. Subsequently storing the locally-generated original data in a faster-tier storage system may include one or more of: compressing the locally-generated original data; and deduplicating the locally-generated original data. Subsequently storing the remotely-generated replication data in a slower-tier storage system may include one or more of: compressing the remotely-generated replication data; and deduplicating the remotely-generated replication data. Subsequently storing the locally-generated original data in a faster-tier storage system may include migrating the locally-generated original data from the non-volatile memory system to a physical memory device associated with the faster-tier storage system. Subsequently storing the remotely-generated replication data in a slower-tier storage system may include migrating the remotely-generated replication data from the volatile memory system to a physical memory device associated with the slower-tier storage system. The slower-tier storage system may be an electromechanical storage system; and the faster-tier storage system may be a solid state storage system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
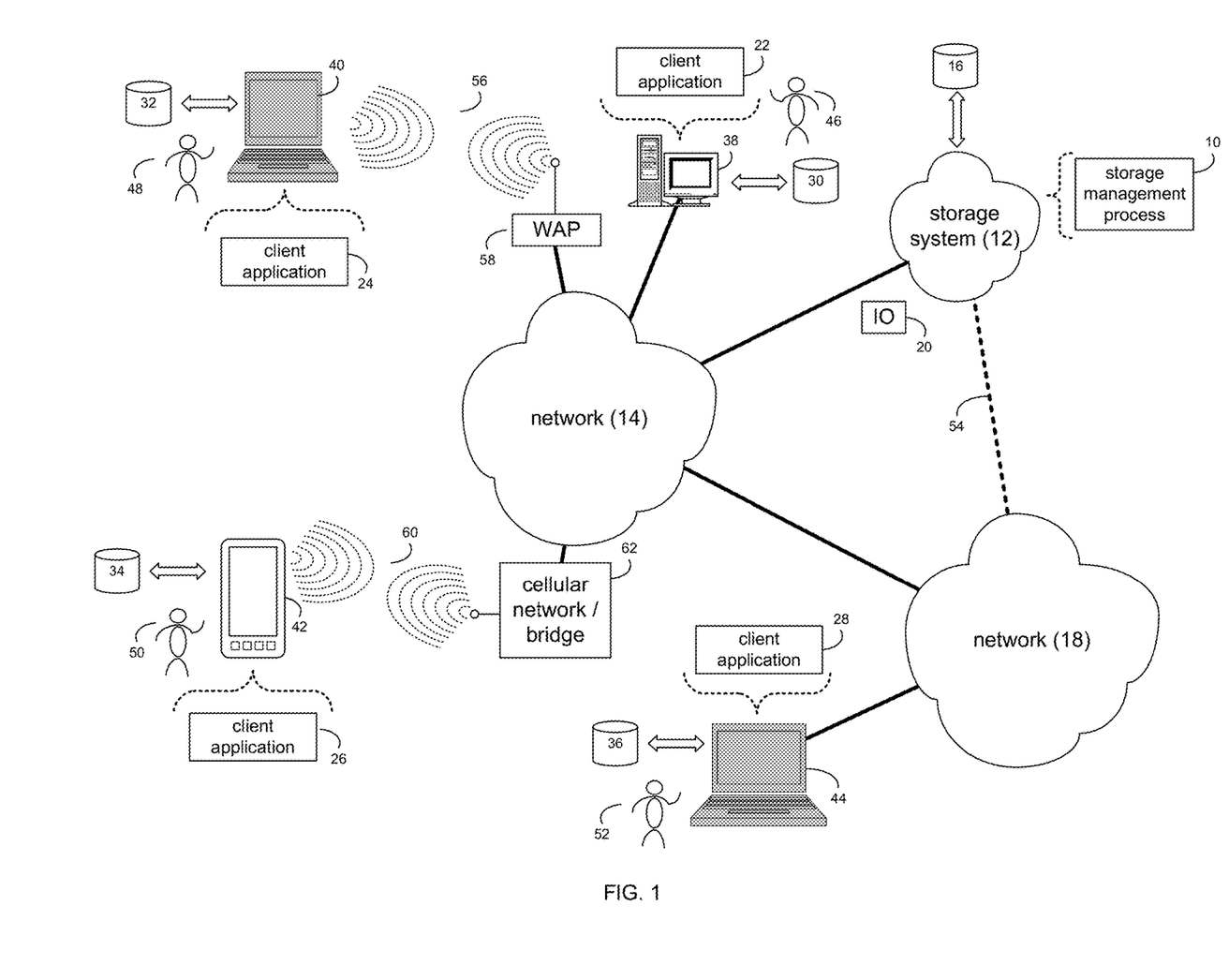
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server®; Redhat Linux®, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
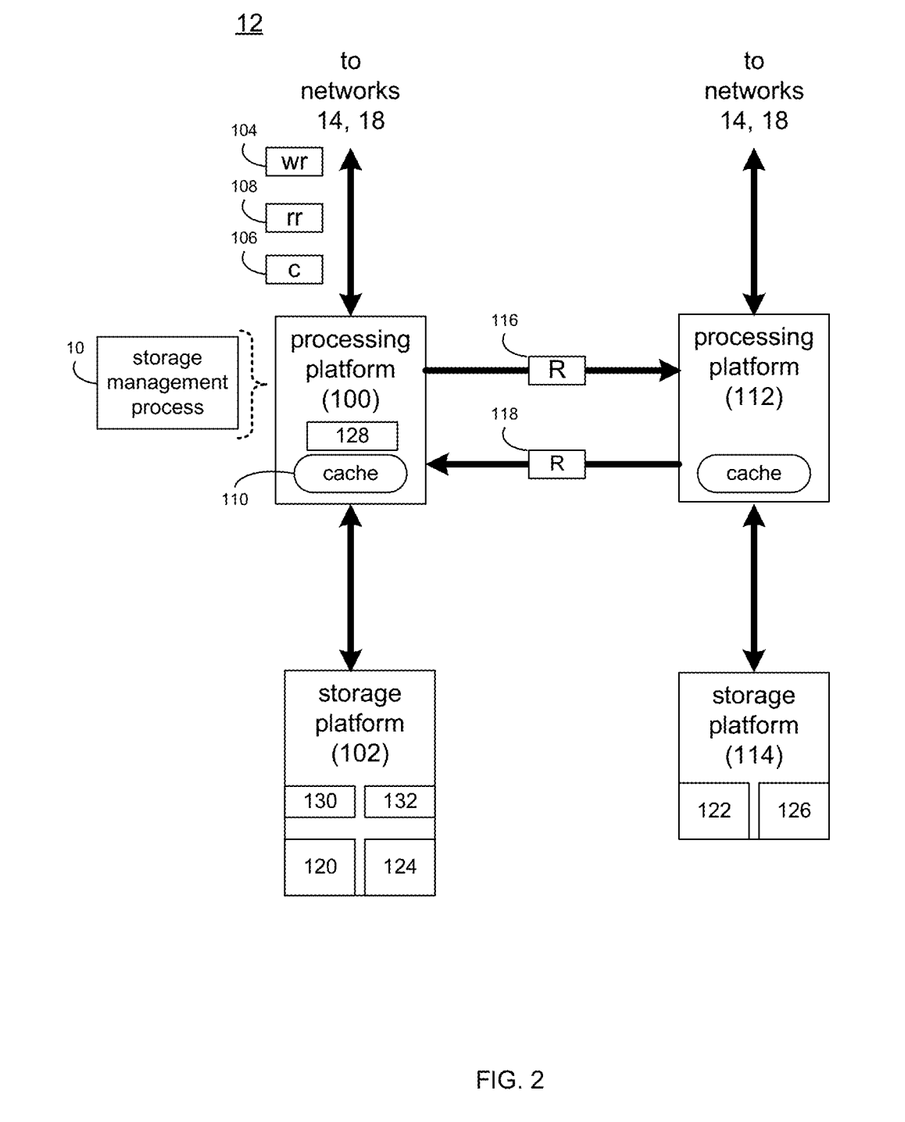
FIG. 2 is a diagrammatic view of the storage system of FIG. 1.

The Data Storage System:

Referring also to FIG. 2, there is shown a general implementation of storage system 12. In this general implementation, storage system 12 may include processing platform 100, wherein processing platform 100 may be configured to perform computational tasks and may be configured to store data within storage platform 102.

Depending on the manner in which storage system 12 is configured, storage platform 102 may include a single storage devices (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 16) coupled to processing platform 100, may be executed by one or more processors (not shown) and one or more memory architectures (not shown) included within processing platform 100. Storage device 16 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing platform 100, content 106 to be written to storage system 12 may be processed by processing platform 100. Additionally/alternatively and when storage system 12 is configured as an application server, content 106 to be written to storage system 12 may be internally generated by processing platform 100.

Processing platform 100 may include cache memory system 110. Examples of cache memory system 110 may include but are not limited to a volatile, solid-state, cache memory system (e.g., a dynamic RAM cache memory system) and/or a non-volatile, solid-state, cache memory system (e.g., a flash-based, cache memory system). Processing platform 100 may initially store content 106 within cache memory system 110. Depending upon the manner in which cache memory system 110 is configured, processing platform 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing platforms and/or storage platforms. For example and in addition to processing platform 100, storage system 12 may include one or more additional processing platforms (e.g., processing platform 112). Further and in addition to storage platform 102, storage system 12 may include one or more additional storage platforms (e.g., storage platform 114).

These processing platforms (e.g., processing platforms 100, 112) and these storage platforms (e.g., storage platforms 102, 114) may be configured so that data received by/generated on e.g., processing platform 100 may be provided (as replication data 116) to processing platform 112 for storage on storage platform 114. Further, data received by/generated on e.g., processing platform 112 may be provided (as replication data 118) to processing platform 100 for storage on storage platform 102.

Each of the storage platforms (e.g., storage platforms 102, 114) may be configured to include a faster-tier storage system (e.g., faster-tier storage systems 120, 122) that may be utilized to store "hotter" (i.e., more frequently used) data and a slower-tier storage system (e.g., slower-tier storage systems 124, 126) that may be utilized to store "colder" (i.e., less frequently used) data.

The faster-tier storage system (e.g., faster-tier storage systems 120, 122) may be a solid state storage system, an example of which may include but is not limited to one or more flash memory storage devices. The slower-tier storage system (e.g., slower-tier storage systems 124, 126) may be an electromechanical storage system, an example of which may include but is not limited to one or more SATA or SAS hard drives. Alternatively, faster-tier storage systems 120, 122 and slower-tier storage systems 124, 126 may both be solid state storage system, wherein faster-tier storage systems 120, 122 may utilize QLC solid state storage devices and slower-tier storage systems 124, 126 may utilize traditional (non-QLC) solid state storage devices.

Figure 3:
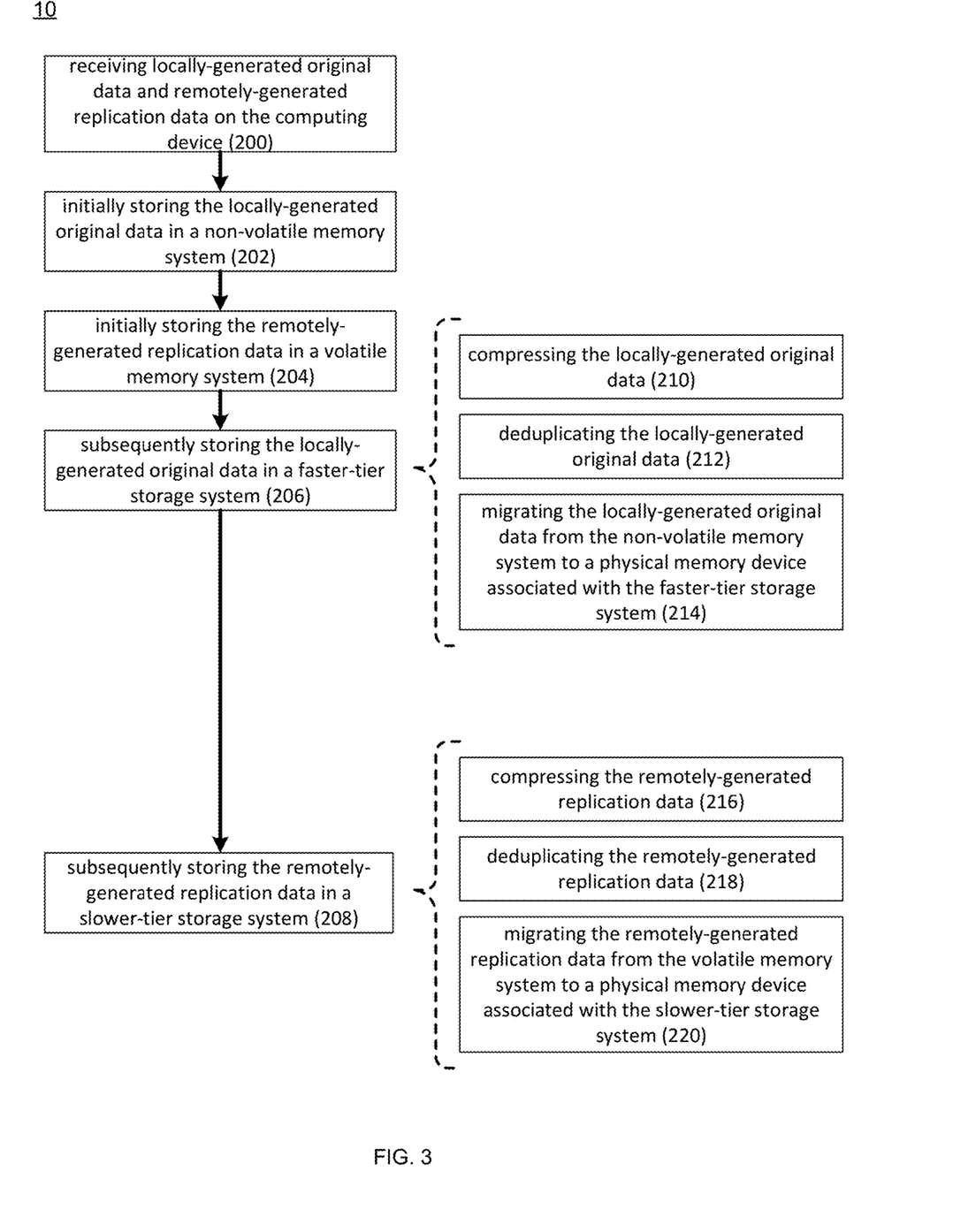
FIG. 3 is a flow chart of the storage management process of FIG. 1.

Referring also to FIG. 3, storage management process 10 may receive 200 locally-generated original data (e.g., content 106) and remotely-generated replication data (e.g., replication data 118) on the computing device (e.g., processing platform 100).

As the locally-generated original data (e.g., content 106) was recently received/generated on processing platform 100, the locally-generated original data (e.g., content 106) is per se "hot" data. Further, as the remotely-generated replication data (e.g., replication data 118) was received on processing platform 100 for replication purposes from a remote computing device (e.g., processing platform 112), the remotely-generated replication data (e.g., replication data 118) is per se "cold" data.

Storage management process 10 may initially store 202 the locally-generated original data (e.g., content 106) in a non-volatile memory system, an example of which may include but is not limited to cache memory system 110. Accordingly, as content 106 is received/generated on processing platform 100, this "hot" data (e.g., content 106) may be initially stored 202 on cache memory system 110.

Further, storage management process 10 may initially store 204 the remotely-generated replication data (e.g., replication data 118) in a volatile memory system, an example of which may include but is not limited to memory buffer 128. Accordingly, as replication data 118 is received on processing platform 100, this "cold" data (e.g., replication data 118) may be initially stored 204 on memory buffer 128. The storage 204 of the remotely-generated replication data (e.g., replication data 118) in a volatile memory system (e.g., memory buffer 128) is permissible even in a high-availability storage system (such as storage system 12) due to the data in question being replication data, namely data that originated remotely and was provided to processing platform 100 for replication purposes. Accordingly and in the event of e.g., a crash or failure of processing platform 100 that results in the loss of replication data 118 within memory buffer 128, the "lost" data (e.g., replication data 118) may be reobtained from (in this example) processing platform 112 via a checkpoint (e.g., a pivot point or a snapshot associated with processing platform 112). Specifically, since replication data 118 is written into a non-user exposed volume, storage system 12 is not committed to return persistent data from an input/output operation to this volume (since this volume is only exposed once the migration/replication cycle is complete). Accordingly, storage system 12 may write all of the changes that result from shipping the snapshot differential into a volatile memory system (e.g., memory buffer 128) until a certain point is reached where it is beneficial to flush memory buffer 128 and reply to processing platform 112 so that processing platform 112 may move the replay pivot point. Accordingly and in the event of a loss of replication data 118, processing platform 112 may replay all the changes starting from that pivot point. By configuring storage system 12 in such a fashion, significant savings may be realized (as maintaining non-volatile state information in a log structured system is computationally expensive).

As will be discussed below in greater detail, storage management process 10 may subsequently store 206 the locally-generated original data (e.g., content 106) in a faster-tier storage system (e.g., faster-tier storage system 120) and may subsequently store 208 the remotely-generated replication data (e.g., replication data 118) in a slower-tier storage system (e.g., slower-tier storage system 124).

Specifically, cache memory system 110 and memory buffer 128 may be used as temporary storage systems to temporarily store content 106 and replication data 118 (respectively) prior to subsequently storing 206, 208 content 106 and replication data 118 on faster-tier storage system 120 and slower-tier storage system 124 (respectively).

Specifically and when subsequently storing 206 the locally-generated original data (e.g., content 106) in a faster-tier storage system (e.g., faster-tier storage system 120), storage management process 10 may compress 210 the locally-generated original data (e.g., content 106) and/or may deduplicate 212 the locally-generated original data (e.g., content 106). For example and in order to maximize the efficiency of the manner in which faster-tier storage system 120 is utilized, various and well known data compression techniques and data deduplication techniques may be employed.

As is known in the art, data compression is a technique for reducing the number of bits needed to represent data within a storage device. Compressing data may save storage capacity, may speed up file transfers, and may decrease the cost for storage hardware and network bandwidth. Compression may be performed via an algorithm that determines how to shrink the size of the data. For instance, the algorithm may represent a larger string of bits with a smaller string of bit and may define a dictionary that maps out the conversion between the strings of bits.

As is known in the art, data deduplication is a technique for eliminating duplicate copies of repeating data. This technique is used to improve storage utilization and can also be applied to network data transfers to reduce the number of bytes that must be sent. In the deduplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is dependent on the chunk size), the amount of data that must be stored or transferred can be greatly reduced.

Further and when subsequently storing 206 the locally-generated original data (e.g., content 106) in a faster-tier storage system (e.g., faster-tier storage system 120), storage management process 10 may migrate 214 the locally-generated original data (e.g., content 106) from the non-volatile memory system (e.g., cache memory system 110) to a physical memory device (e.g., memory device 130) associated with the faster-tier storage system (e.g., faster-tier storage system 120). An example of memory device 130 may include but is not limited to one or more PLB (i.e., physical large block) storage devices, wherein the locally-generated original data (e.g., content 106) may be migrated 214 from cache memory system 110 to memory device 130. For example, as cache memory system 110 may have limited storage capacity, the locally-generated original data (e.g., content 106) may be routinely migrated 214 from cache memory system 110 to memory device 130.

As discussed above, the faster-tier storage system (e.g., faster-tier storage system 120) may be a solid state storage system, an example of which may include but is not limited to one or more flash memory storage devices. Accordingly, memory device 130 may be a portion of faster-tier storage system 120, wherein the locally-generated original data (e.g., content 106) may be migrated 214 from cache memory system 110 to memory device 130 using a log-structured data writing methodology. Specifically, as the locally-generated original data (e.g., content 106) is migrated 214 to memory device 130, the locally-generated original data (e.g., content 106) may be written in a sequential fashion. And as updated versions of the various files included within the locally-generated original data (e.g., content 106) are migrated 214 to memory device 130, the updated versions of these files may be written to another area of the memory device 130. Further, well known garbage collection methodologies may be used to reclaim storage space within memory device 130 that was utilized to older versions of file(s).

In computer science, garbage collection (GC) is a form of automatic storage management. The garbage collector may reclaim storage space occupied by objects that are no longer in use by a program, may join fragmented data, and may move data to new locations (e.g., thus effectuating defragmentation of the storage device).

When subsequently storing 208 the remotely-generated replication data (e.g., replication data 118) in a slower-tier storage system (e.g., slower-tier storage system 124), storage management process 10 may compress 216 the remotely-generated replication data (e.g., replication data 118) and/or deduplicate 218 the remotely-generated replication data (e.g., replication data 118). As discussed above and in order to maximize the efficiency of the manner in which slower-tier storage system 124 is utilized, various and well known data compression techniques and data deduplication techniques may be employed.

Further and when subsequently storing 208 the remotely-generated replication data (e.g., replication data 118) in a slower-tier storage system (e.g., slower-tier storage system 124), storage management process 10 may migrate 220 the remotely-generated replication data (e.g., replication data 118) from the volatile memory system (e.g., memory buffer 128) to a physical memory device (e.g., memory device 132) associated with the slower-tier storage system (e.g., slower-tier storage system 124).

The remotely-generated replication data (e.g., replication data 118) may be migrated 220 from memory buffer 128 to memory device 132 using a log-structured data writing methodology. Specifically, as the remotely-generated replication data (e.g., replication data 118) is migrated 220 to memory device 132, the remotely-generated replication data (e.g., replication data 118) may be written in a sequential fashion. And as updated versions of the various files included within the remotely-generated replication data (e.g., replication data 118) are migrated 220 to memory device 132, the updated versions of these files may be written to another area of the memory device 132. Further, well known garbage collection methodologies may be used to reclaim storage space within memory device 132 that was utilized to older versions of file(s).

An example of memory device 132 may include but is not limited to a portion of slower-tier storage system 124. For example and if slower-tier storage system 124 is a storage solid state storage device, memory device 132 may be one or more PLB (i.e., physical large block) storage devices. Further and if slower-tier storage system 124 is an electromechanical storage system, memory device 132 may be a portion of one or more hard disk drives. As memory buffer 128 may have limited storage capacity, the remotely-generated replication data (e.g., replication data 118) may be routinely migrated 220 from memory buffer 128 to memory device 132.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving locally-generated original data and remotely-generated replication data on the computing device;
   initially storing the locally-generated original data in a non-volatile memory system;
   initially storing the remotely-generated replication data in a volatile memory system;
   subsequently storing the locally-generated original data in a faster-tier storage system; and
   subsequently storing the remotely-generated replication data in a slower-tier storage system.

2. The computer-implemented method of claim 1 wherein:
   the non-volatile memory system is a cache memory system; and
   the volatile memory system is a memory buffer.

3. The computer-implemented method of claim 1 wherein subsequently storing the locally-generated original data in a faster-tier storage system includes one or more of:
   compressing the locally-generated original data; and
   deduplicating the locally-generated original data.

4. The computer-implemented method of claim 1 wherein subsequently storing the remotely-generated replication data in a slower-tier storage system includes one or more of:
   compressing the remotely-generated replication data; and
   deduplicating the remotely-generated replication data.

5. The computer-implemented method of claim 1 wherein subsequently storing the locally-generated original data in a faster-tier storage system includes:
   migrating the locally-generated original data from the non-volatile memory system to a physical memory device associated with the faster-tier storage system.

6. The computer-implemented method of claim 1 wherein subsequently storing the remotely-generated replication data in a slower-tier storage system includes:
   migrating the remotely-generated replication data from the volatile memory system to a physical memory device associated with the slower-tier storage system.

7. The computer-implemented method of claim 1 wherein:
   the slower-tier storage system is an electromechanical storage system; and
   the faster-tier storage system is a solid state storage system.

8. A computer program product residing on a non-transitory computer readable medium having a plurality of instructions stored thereon which, when executed by a processor, cause the processor to perform operations comprising:
   receiving locally-generated original data and remotely-generated replication data on the computing device;
   initially storing the locally-generated original data in a non-volatile memory system;
   initially storing the remotely-generated replication data in a volatile memory system;
   subsequently storing the locally-generated original data in a faster-tier storage system; and
   subsequently storing the remotely-generated replication data in a slower-tier storage system.

9. The computer program product of claim 8 wherein:
   the non-volatile memory system is a cache memory system; and
   the volatile memory system is a memory buffer.

10. The computer program product of claim 8 wherein subsequently storing the locally-generated original data in a faster-tier storage system includes one or more of:
    compressing the locally-generated original data; and
    deduplicating the locally-generated original data.

11. The computer program product of claim 8 wherein subsequently storing the remotely-generated replication data in a slower-tier storage system includes one or more of:
    compressing the remotely-generated replication data; and
    deduplicating the remotely-generated replication data.

12. The computer program product of claim 8 wherein subsequently storing the locally-generated original data in a faster-tier storage system includes:
    migrating the locally-generated original data from the non-volatile memory system to a physical memory device associated with the faster-tier storage system.

13. The computer program product of claim 8 wherein subsequently storing the remotely-generated replication data in a slower-tier storage system includes:
    migrating the remotely-generated replication data from the volatile memory system to a physical memory device associated with the slower-tier storage system.

14. The computer program product of claim 8 wherein:
    the slower-tier storage system is an electromechanical storage system; and
    the faster-tier storage system is a solid state storage system.

15. A computing system including a processor and memory configured to perform operations comprising:
    receiving locally-generated original data and remotely-generated replication data on the computing device;
    initially storing the locally-generated original data in a non-volatile memory system;
    initially storing the remotely-generated replication data in a volatile memory system;
    subsequently storing the locally-generated original data in a faster-tier storage system; and
    subsequently storing the remotely-generated replication data in a slower-tier storage system.

16. The computing system of claim 15 wherein:
    the non-volatile memory system is a cache memory system; and
    the volatile memory system is a memory buffer.

17. The computing system of claim 15 wherein subsequently storing the locally-generated original data in a faster-tier storage system includes one or more of:
    compressing the locally-generated original data; and
    deduplicating the locally-generated original data.

18. The computing system of claim 15 wherein subsequently storing the remotely-generated replication data in a slower-tier storage system includes one or more of:
    compressing the remotely-generated replication data; and
    deduplicating the remotely-generated replication data.

19. The computing system of claim 15 wherein subsequently storing the locally-generated original data in a faster-tier storage system includes:
    migrating the locally-generated original data from the non-volatile memory system to a physical memory device associated with the faster-tier storage system.

20. The computing system of claim 15 wherein subsequently storing the remotely-generated replication data in a slower-tier storage system includes:

migrating the remotely-generated replication data from the volatile memory system to a physical memory device associated with the slower-tier storage system.

21. The computing system of claim 15 wherein:

the slower-tier storage system is an electromechanical storage system; and the faster-tier storage system is a solid state storage system.

\* \* \* \* \*